C. L. WAFFLE.
Cultivator.

No. 105,745.  Patented July 26, 1870.

Witnesses:
John Becker
S. S. Mabee

Inventor:
C. L. Waffle
per Munn & Co
Attorneys.

UNITED STATES PATENT OFFICE.

CHARLES L. WAFFLE, OF SHARON CENTRE, OHIO.

IMPROVEMENT IN CULTIVATORS.

Specification forming part of Letters Patent No. 105,745, dated July 26, 1870.

*To all whom it may concern:*

Be it known that I, CHARLES L. WAFFLE, of Sharon Centre, in the county of Medina and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification.

Figure 1:
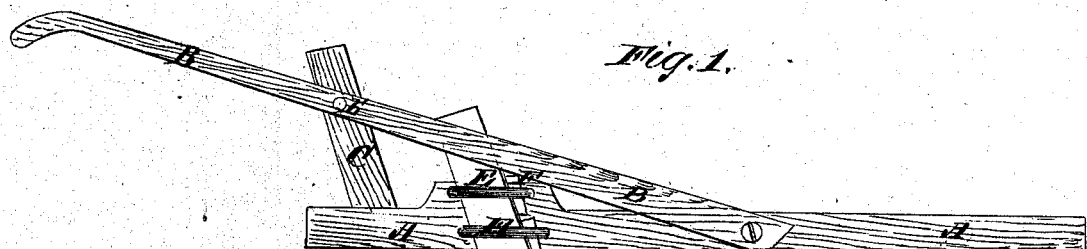
Figure 2:
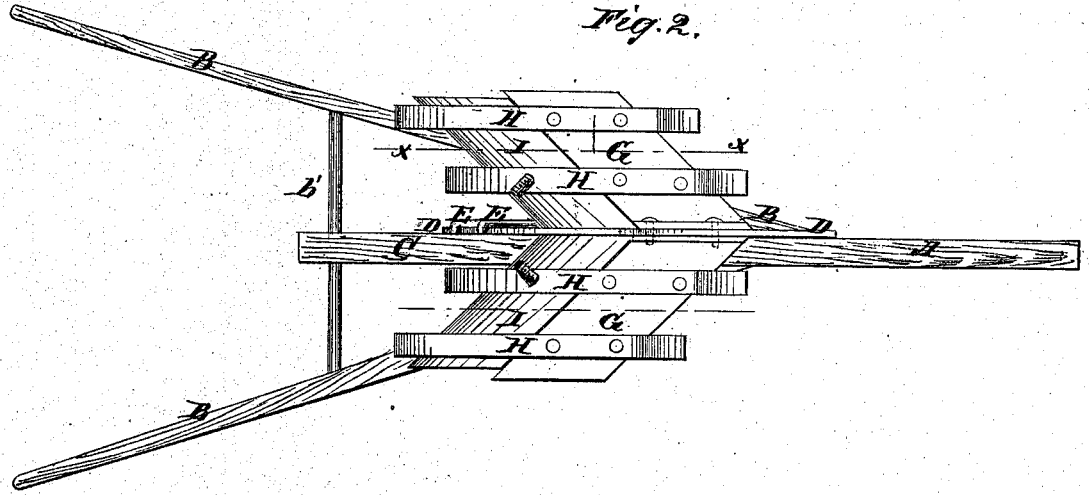

Figure 1 is a detail side view of my improved cultivator, partly in section, through the line $xx$, Fig. 2. Fig. 2 is an under side view of the same.

Similar letters of reference indicate corresponding parts.

My invention has for its object to furnish an improved cultivator which shall be so constructed and arranged that it may be readily adjusted for simply stirring up, loosening, and pulverizing the soil, and for throwing the soil around the plants, and which shall at the same time be simple in construction, easily operated, and effective in operation in either capacity; and it consists in the construction and combination of the various parts, as hereinafter more fully described.

A represents the beam, to the forward end of which the draft is applied in the ordinary manner.

B are the handles, the forward ends of which are securely attached to the sides of the beam A. The rear parts of the handles B are supported and held in their proper relative position by the upright C, the lower end of which is attached to the rear end of the beam A, and through the upper end of which passes the round $b'$ of the said handles B.

D is the plow-standard, the upper end or shank of which passes up along the side of the beam A and through the two staples, E, which are placed one above the other, and the arms of which pass through the said beam, and are secured upon its other side by nuts or by being riveted down or headed, as may be desired or convenient. The standard D is secured in place in the staple E by the two wedge-keys F, which are driven into said staples along the front or rear edge of said standard. By this construction, by loosening the said wedge-keys F the standard D may be raised and lowered at will, and by shifting the one or the other of said keys from the front to the rear edge of said standard, or the contrary, the pitch of the plow may be adjusted as required. The lower part of the standard D is bent forward, as shown in Fig. 1, so that its pointed forward end may serve as a plow-point, and so that its lower edge may serve as a shoe for the plow. G are the shares or cutters, the inner ends of which are bent down or flanged to fit against the sides of the lower or horizontal part of the standard D, to which they are securely bolted, as shown in Figs. 1 and 2. The shares G are set inclined, as shown in Fig. 2, and their rear edges are at a little higher level than their forward edges, as shown in Fig. 1.

To the under sides of each of the shares G are bolted two or more fingers or bars, H, the forward ends or points of which project beyond and below the lower or forward edges of the shares G. The rear ends of the bars H project beyond and above the upper or rear edges of the said shares G, to serve as fingers to divide and pulverize the soil as it passes off the said shares G.

As thus described the machine is used simply as a cultivator for loosening, stirring up, and pulverizing the soil and cutting off and destroying the weeds and grass, and may be worked close to the row of plants without disturbing the said plants or injuring their roots.

When the soil is desired to be thrown around the plants mold-boards I are bolted to one or more of the bars H, the inner ends of which meet at an angle above the bend of the standard D, and the lower edges of which rest upon the upper edges of the shares G, as shown in Figs. 1 and 2.

Having thus described my invention, I claim as new and desire to secure by Letters Patent—

1. The arrangement on one side of the standard A of two parallel staples, E E, the lower one slightly farther forward than the upper, to form a rest for the plow-standard and to enable the same to be adjusted by wedges vertically or horizontally, as set forth.

2. The arrangement of the projecting points of fingers H below the edges of the shovels or shares of a cultivator, to pulverize the soil in advance, as set forth.

CHARLES L. WAFFLE.

Witnesses:
ARTHERTON H. FARNHAM,
SAMUEL D. CRANE.